United States Patent
Chiu et al.

(10) Patent No.: US 8,218,082 B2
(45) Date of Patent: *Jul. 10, 2012

(54) CONTENT ADAPTIVE NOISE REDUCTION FILTERING FOR IMAGE SIGNALS

(75) Inventors: Yi-Jen Chiu, San Jose, CA (US); Louis Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,175

(22) Filed: Aug. 24, 2010

(65) Prior Publication Data

US 2010/0315558 A1    Dec. 16, 2010

Related U.S. Application Data

(63) Continuation of application No. 11/230,148, filed on Sep. 19, 2005, now Pat. No. 7,804,896.

(51) Int. Cl.
*H04N 5/21* (2006.01)
(52) U.S. Cl. ............ 348/608; 348/E5.078; 375/240.03; 382/232; 382/235
(58) Field of Classification Search .............. 382/233, 382/235, 266; 375/240.03, 240.29
See application file for complete search history.

(56) References Cited

U.S. PATENT DOCUMENTS

| | | | | |
|---|---|---|---|---|
| 5,786,857 | A * | 7/1998 | Yamaguchi | 375/240.03 |
| 7,327,785 | B2 * | 2/2008 | Bjontegaard | 375/240.03 |
| 7,400,679 | B2 * | 7/2008 | Kwon et al. | 375/240.03 |
| 7,403,568 | B2 * | 7/2008 | Dumitras et al. | 375/240.29 |
| 7,496,141 | B2 * | 2/2009 | Kwon et al. | 375/240.03 |
| 2003/0020835 | A1 | 1/2003 | Petrescu | |
| 2004/0081368 | A1 | 4/2004 | Mathew et al. | |

OTHER PUBLICATIONS

Gerasimos Louverdis, Ioannis Andreadis, and Antonios Gasteratos, "A New Content Based Median Filter", In EUSIPCO 2004, Vienna, Austria, Sep. 2004, 4pgs.

* cited by examiner

*Primary Examiner* — Stephen R Koziol
(74) *Attorney, Agent, or Firm* — Buckley, Maschoff & Talwalkar LLC

(57) ABSTRACT

A method includes selecting a target pixel and comparing a value of the target pixel with a respective value of each of a plurality of pixels located in an area that includes the target pixel. Further, for each pixel of the plurality of pixels that has a value different by at least a threshold amount from the value of the target pixel, the value of such pixel is replaced by the value of the target pixel. A filter function is applied to a set of pixels which includes the value of the target pixel and current values, after the selective replacement step, of the plurality of pixels.

13 Claims, 9 Drawing Sheets

CONTENT ADAPTIVE NOISE REDUCTION FILTERING FOR IMAGE SIGNALS

CROSS REFERENCE TO RELATED APPLICATION

The present application is a Continuation of U.S. patent application Ser. No. 11/230,148, filed Sep. 19, 2005.

BACKGROUND

It is known to perform noise reduction processing on video signals to improve perceived image quality by mitigating the effects of noise that typically is present in the video signals. Sources of noise include compression encoding/decoding, which may result in various types of artifacts such as block noise, ringing noise, mosquito noise and transform noise. Other sources of noise may include video capture processing, analog-to-digital conversion, and signal transmission.

Noise reduction processing may be performed after video signal decompression (decoding) for purposes of image quality improvement, and may also be performed prior to transmission or recording, to avoid wasting bandwidth on transmission/recording of artifacts as well as for quality considerations.

Typical kinds of noise reduction processing involve low pass filtering of the video signal. Although generally worthwhile to mitigate artifacts, such filtering may also blur the image to some extent, so that noise reduction processing may entail trading off one type of distortion for another. Computational complexity may also be a drawback in noise reduction processing.

DETAILED DESCRIPTION

Figure 1:
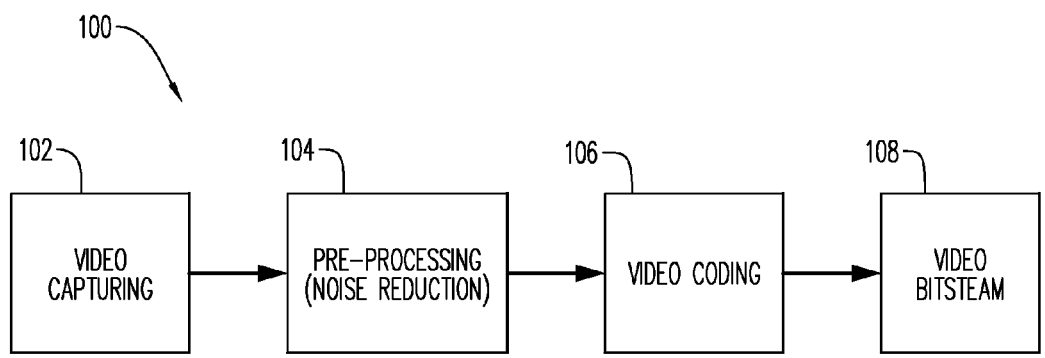
FIG. 1 is a block diagram of an apparatus which generates a video bitstream from captured images in accordance with some embodiments.

FIG. 1 is a block diagram of an apparatus 100 which generates a video bitstream from captured images in accordance with some embodiments.

The apparatus 100 includes a video signal capture device 102 such as a digital video camera. The apparatus 100 further includes a pre-processing block 104 which is coupled to the video signal capture device 102. The pre-processing block 104 performs one or more kinds of pre-processing on the captured video signal provided by the video signal capture device 102. For example, the pre-processing block 104 may perform one or more different kinds of noise reduction processing as in one of the embodiments described below.

The apparatus 100 also includes a compression encoding block 106 which is coupled to the pre-processing block 104. The compression encoding block 106 may apply compression encoding in accordance with conventional practices to the pre-processed video signal provided by the pre-processing block 104.

In addition, the apparatus 100 may include a transmitter 108 coupled to the compression encoding block 106 to transmit the compression encoded video signal in the form of a video signal bitstream over a communication channel which is not separately shown.

Details of embodiments of the pre-processing block 104 will be discussed below.

Figure 2:
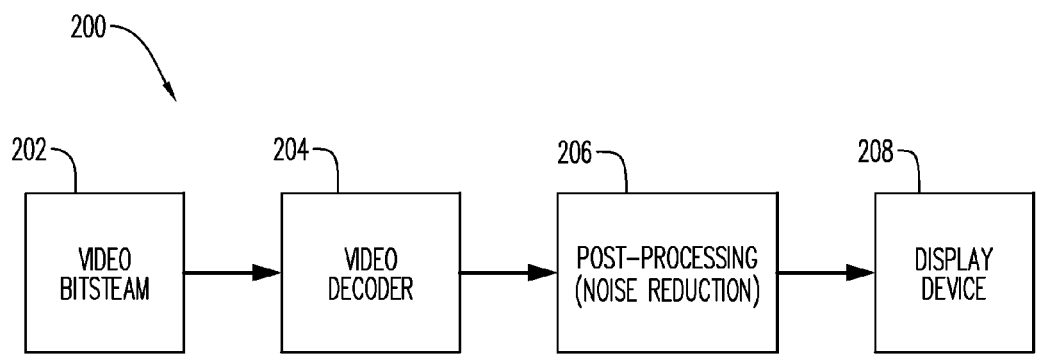
FIG. 2 is a block diagram of an apparatus which generates a video display from a video bitstream in accordance with some embodiments.

FIG. 2 is a block diagram of an apparatus 200 which generates a video display from a video bitstream in accordance with some embodiments.

The apparatus 200 includes a source 202 of a video signal bitstream. For example, the video signal source 202 may receive a video signal via a communication channel (which is not separately shown) or may reproduce a video signal from a storage medium such as a DVD or a hard disk drive. For example, the video signal source may include a video tuner, a satellite earth station, or a DVD player. It will be assumed that the video signal bitstream represents a video signal that has been compression encoded, e.g., in accordance with one of the MPEG compression standards. The video signal source 202 may operate in accordance with conventional practices.

The apparatus 200 also includes a video decoder 204 which is coupled to the video signal source to de-compress the video signal bitstream supplied by the video signal source 202. The video decoder 204 may operate in accordance with conventional principles, and may tend to produce artifacts in the output video image, subject to amelioration via embodiments to be described below.

The apparatus 200 further includes a post-processing block 206 which is coupled to the video decoder 204. The post-processing block 206 performs one or more kinds of post processing on the decompressed video signal output from the video decoder 204. For example, the post-processing block 206 may perform one or more different kinds of noise reduction processing as in one or more of the embodiments described below.

In addition, the apparatus 200 includes a display device 208, such as a conventional television set or a computer display monitor. The display device 208 displays the video signal that is output from the post-processing block 206.

Figure 3:
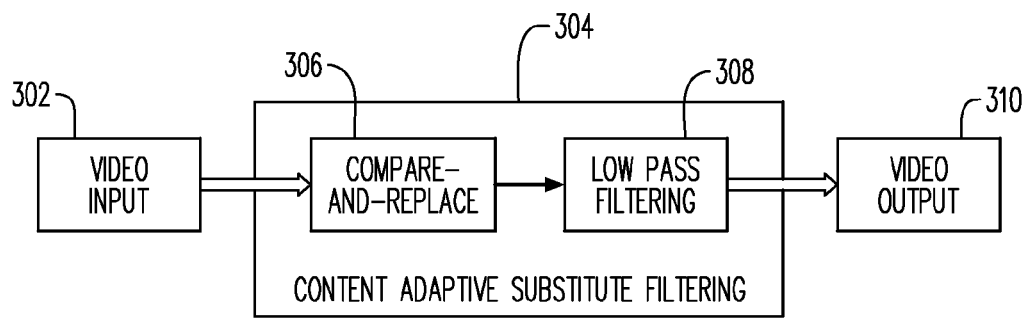
FIG. 3 is a functional block diagram that illustrates some operations of a noise reduction block that is part of the apparatus of FIG. 1 or FIG. 2.

FIG. 3 is a functional block diagram that illustrates aspects of a noise reduction process performed in the pre-processing block 104 or in the post-processing block 206 in accordance with some embodiments.

Block 302 represents the pre-processing block 104 or the post-processing block 206 (or a noise reduction sub-block) receiving an input video signal (e.g., directly or indirectly from the video capturing device 102, or directly or indirectly from the video decoder 204) that is to be subjected to noise reduction processing. Block 304 represents circuitry (specially designed or programmed) provided in accordance with some embodiments to apply a filtering process that may be referred to as a "content adaptive substitute filtering" process. As will be described below in more detail, prospective pixel values to be used for filtering are (as indicated by block 306) compared with target pixel values and are replaced in some cases to support improved low-pass filtering (indicated by block 308). Output of the resulting low-pass filtered video signal is indicated at block 310.

Figure 4:
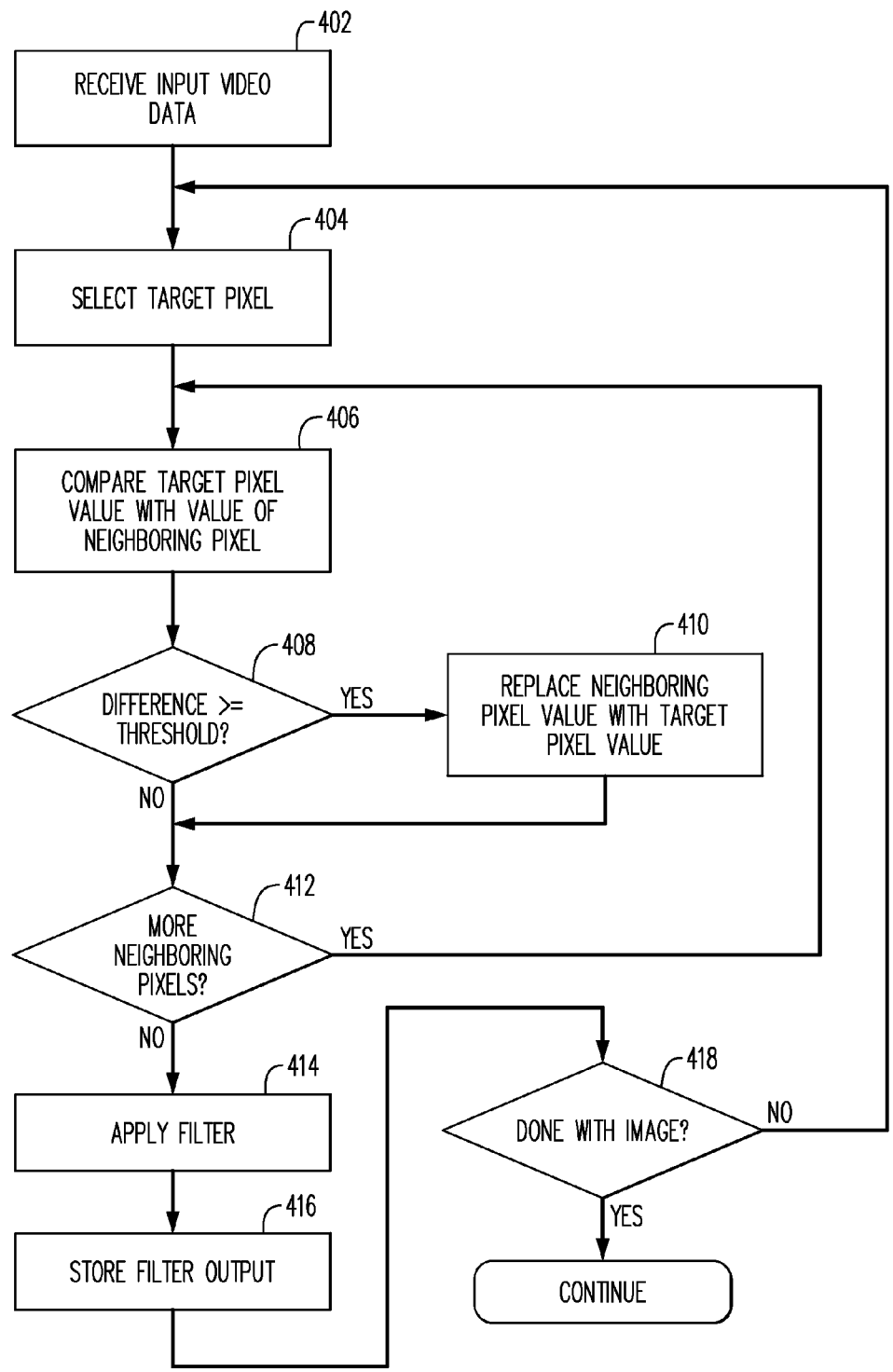
FIG. 4 is a flow chart that illustrates a process performed by the noise reduction block.

FIG. 4 is a flow chart that illustrates an embodiment of a content adaptive substitute filtering process that may be performed in block 304 (FIG. 3). Referring now to FIG. 4, block 402 represents block 304 receiving the input video signal (e.g., after video capture or after de-compression of a previously compression-encoded video signal). Block 404 represents selection of a target pixel x from the input video signal. The target pixel x is the pixel for which a filtered output value is now to be calculated. In a particular example of content adaptive substitute filtering, the filter output value for each target pixel is determined on the basis of pixel values in a filter support neighborhood area that is a three-pixel-by-three-pixel square centered on the target pixel x. This area may be referred to as NH(x) or, since the total area corresponds to 9 pixels, as NH9(x). (In some embodiments, a filter support area other than three-pixels-by-three-pixels may be used. For example, filter support areas of four-pixels-by-four-pixels, five-pixels-by-five-pixels, six-pixels-by-six-pixels or seven-pixels-by-seven-pixels may be used in alternative embodiments.)

At 406 in FIG. 4, the value of one of the neighboring pixels y in NH9(x) is compared with the value of pixel x. At 408 it is determined whether the absolute value of the difference between the two pixel values is at least as great as a threshold amount TH(x). (In the particular embodiment now being discussed, TH(x) may be a constant that is used in connection with all target pixels, but in other embodiments, as described below, TH(x) may vary from target pixel to target pixel. In some embodiments, the constant used for TH(x) may be programmable by a user or designer of the apparatus 100 or 200.)

If at 408 it is determined that the absolute value of the difference between the two pixel values is at least as great as TH(x), then, at 410, the value of neighboring pixel y is replaced with the value of the target pixel x for the purposes of applying a filtering function to calculate an output filtered pixel value for the target pixel. If at 408 it is determined that the absolute value of the difference between the two pixel values is less than TH(x), then the value of the neighboring pixel is not replaced. Following 408 in the latter case, or following 410, as the case may be, is a decision block 412, at which it is determined whether there remain any neighboring pixels in NH9(x), which have not been compared with the target pixel. If such is the case, then the process of FIG. 4 loops back to 406 for consideration of another neighboring pixel in NH9(x). If such is not the case, the process proceeds to apply a low-pass filter characteristic to generate a filtered output value for the target pixel, as indicated at 414 and as will be discussed further below.

Figure 5:
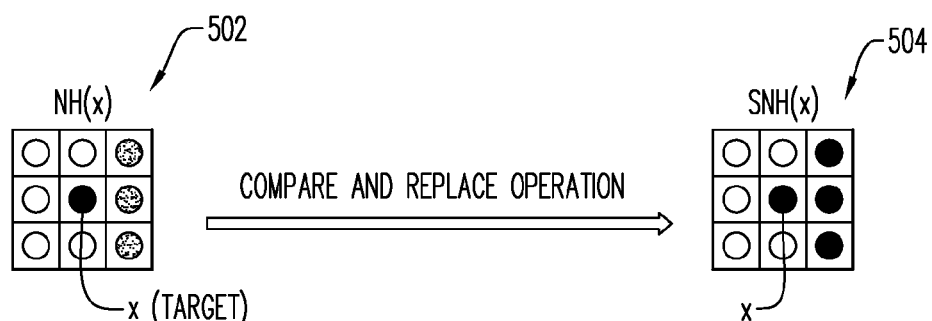
FIG. 5 schematically illustrates aspects of the process of FIG. 4.

FIG. 5 schematically illustrates an example of how the loop 406-412 may operate in connection with a particular target pixel x. The original condition of NH(x) is indicated at 502, with the target pixel x being represented by the solid black pixel at the center of the array shown at 502. The hollow circles in the array 502 represent neighboring pixels for which the values differ from the value of pixel x (if at all) by less than TH(x). The shaded circles in the array 502 represent neighboring pixels for which the values differ from the value of pixel x by at least TH(x). As indicated schematically at 504, the values of the latter neighboring pixels are replaced by the value of the target pixel x to form a substitute filter support array SNH(x). The set of pixel values represented by SNH(x) includes the value of the target pixel and "current values" of the neighboring pixels, where the current value of a neighboring pixel is the original value of the pixel if the value has not undergone replacement and is the value of the target pixel if replacement has occurred. By operation of this compare and replace process, outlier pixel values are removed from the filter support area so that more satisfactory filter results may be obtained. At the same time, the outlier values are each replaced with the target pixel value, so that the number of input values for the filtering function is the same for each target pixel, thereby reducing complexity of hardware implementation. This is in contrast to the known "sigma filter", in which outlier values are simply discarded, leading to varying numbers of input values and complex implementation.

Referring again to 412 in FIG. 4, in some embodiments the filter function to be applied to generate the output filtered value for the target pixel x may be defined by the following weight matrix:

$$\begin{bmatrix} 1 & 2 & 1 \\ 2 & 4 & 2 \\ 1 & 2 & 1 \end{bmatrix}$$

To reduce the complexity of the calculations, this two-dimensional matrix may be decomposed into two one dimensional matrices:

$$\begin{bmatrix} 1 \\ 2 \\ 1 \end{bmatrix} * [1 \ 2 \ 1]$$

(Filter characteristics other than that indicated above may be used in other embodiments. For example, filter characteristics suitable for other sizes of filter support may be used.)

In some embodiments, the output filtered value for the target pixel x may be calculated as follows:

$$(1/16) * \left( \left( \sum_{y \in NH9(x)} w(y) * \{y\} \right) + 8 \right),$$

where w(y) is the value of the weighting matrix at the position of the pixel y∈NH9(x), and {y} is the value of that pixel. It will be noted that 16 is the summation over the weighting matrix and 8 is one-half of that summation, the latter term being applied for purposes of rounding.

In other embodiments, other filter functions may be applied. Also, in other embodiments, other sizes and/or shapes of filter support areas may be employed rather than the above-described three-pixel-by-three-pixel filter support area.

Once the filter function has been applied to SNH(x) and the resulting output filtered value for the target pixel has been calculated, the output filtered value may be stored, as indicated at 416 in FIG. 4. It is next determined, at decision block 418, whether output filtered values have been obtained for all of the target pixels in the image that is being processed. If not, the process of FIG. 4 loops back to 404. Otherwise the process is complete. It will be appreciated that the content adaptive substitute filter process illustrated in FIG. 4 may be applied to each image represented by the input video signal.

The content adaptive substitute filtering arrangement of FIGS. 3-5 may provide improved noise reduction filtering with a low degree of implementation complexity.

Figure 6:
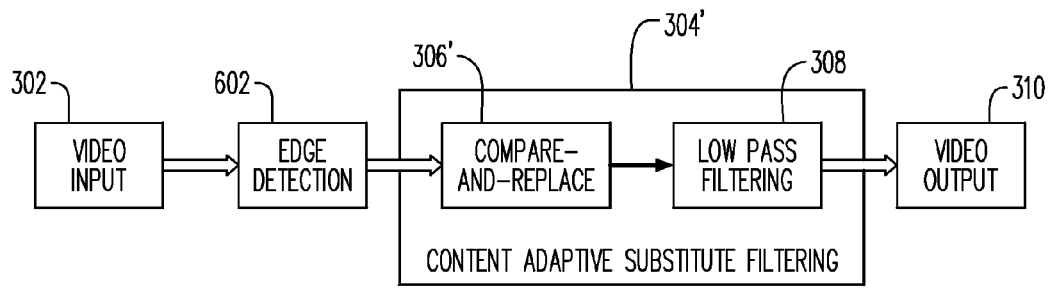
FIG. 6 is a functional block diagram that illustrates some operations of the noise reduction block in some other embodiments.

FIG. 6 is a functional block diagram that illustrates aspects of a noise reduction process performed in the pre-processing block 104 or in the post-processing block 206 in accordance with some other embodiments. In these other embodiments, operation of the content adaptive substitute filtering may be modified to incorporate adaptation of the substitution threshold amount TH(x) by taking into consideration the presence of edge conditions at the target pixel x.

Referring to FIG. 6, the functional blocks that were discussed above in connection with FIG. 3 are also present in FIG. 6, except that blocks 304' and 306' in FIG. 6 reflect capability to modify in the value of TH(x) from target pixel to target pixel. In addition, the arrangement of FIG. 6 includes a functional block 602 which performs edge detection processing at each target pixel.

Figure 7A:
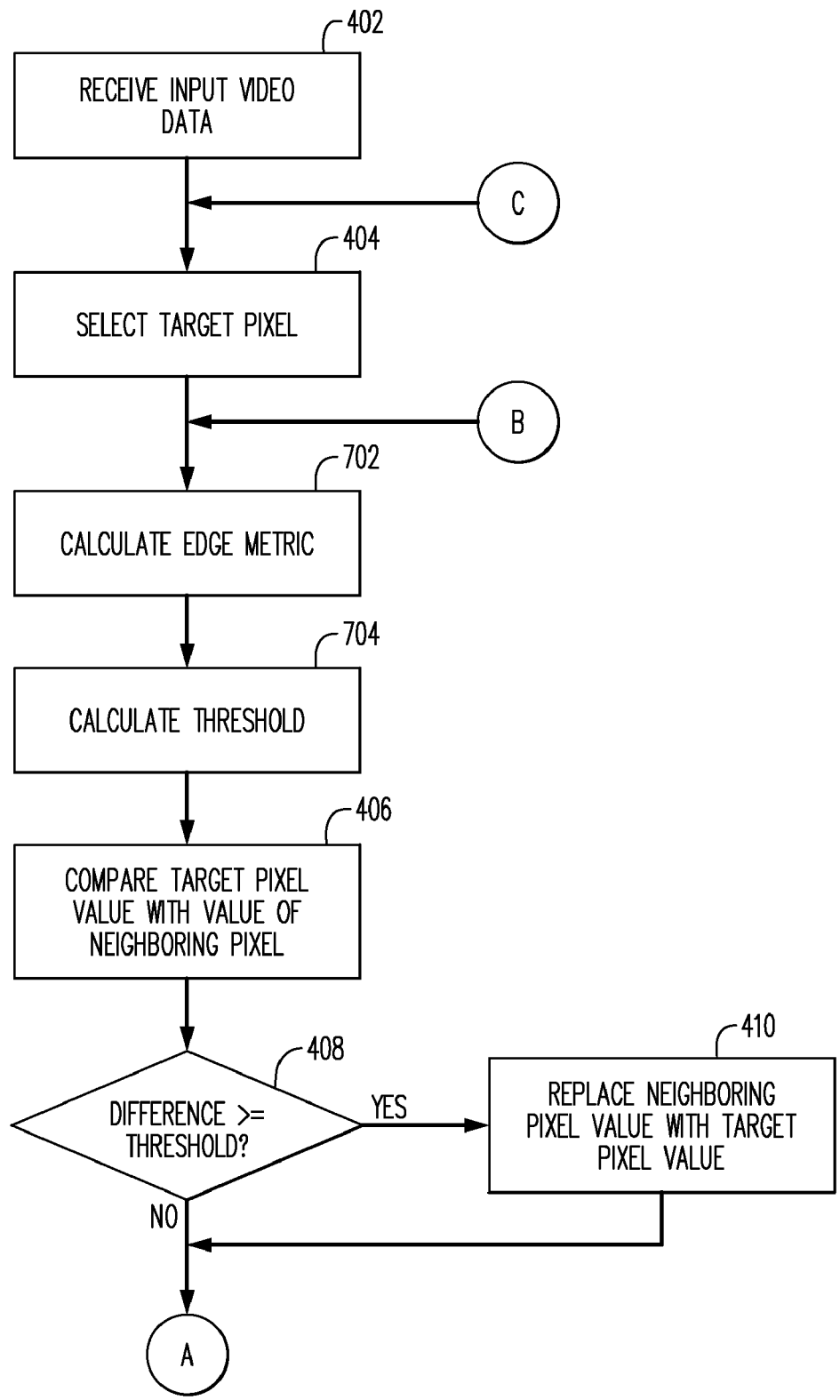
FIGS. 7A and 7B together form a flow chart that illustrates a process that may be performed in connection with the functional arrangement of FIG. 6.
Figure 7B:
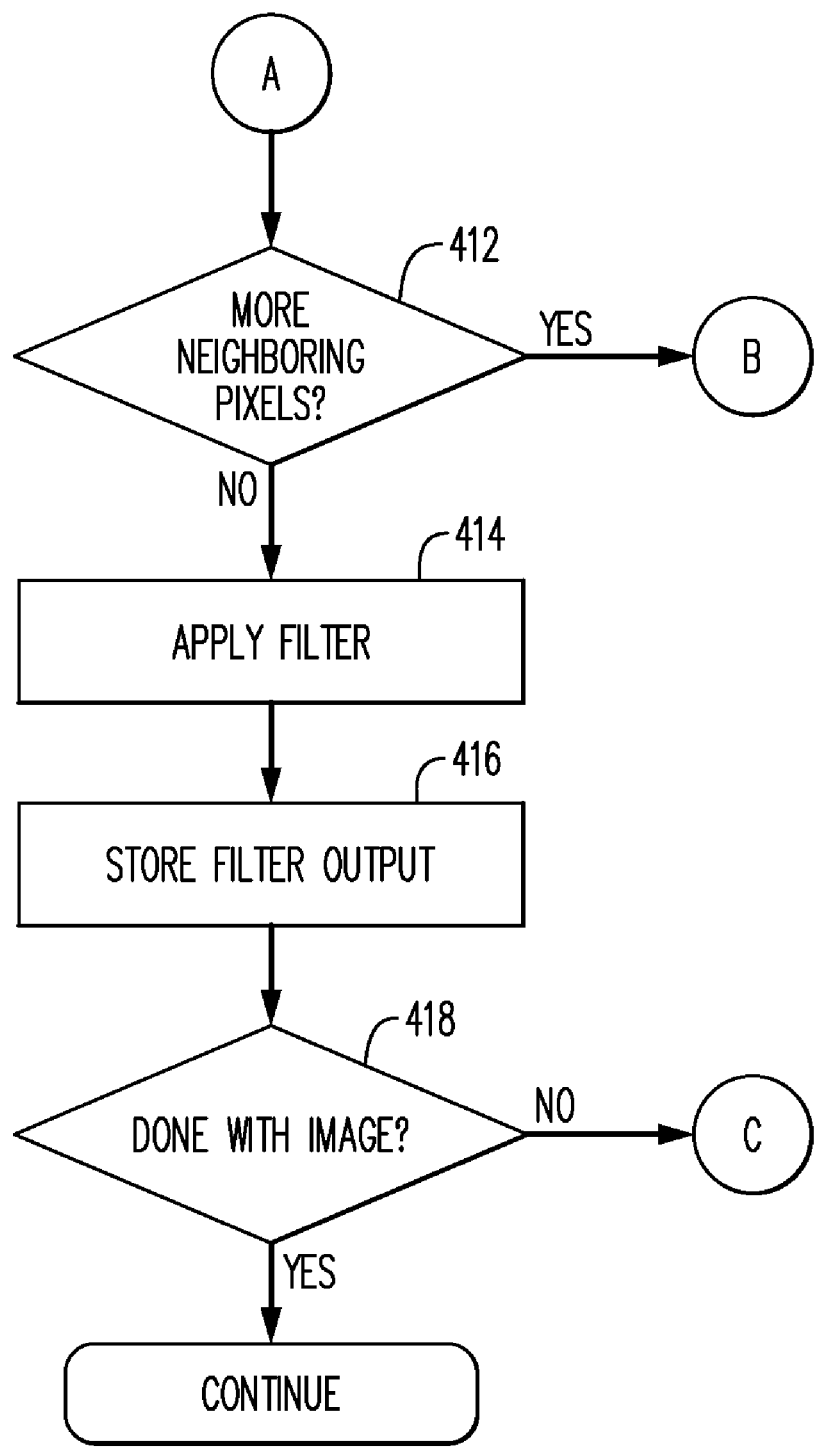

FIGS. 7A and 7B together form a flow chart that illustrates an embodiment of an edge-sensitive content adaptive substitute filtering process that may be performed by blocks 602 and 304' of FIG. 6. The process of FIGS. 7A and 7B may begin with the same blocks 402 and 404 discussed above in connection with FIG. 4. In addition, the process of FIGS. 7A and 7B includes a block 702 at which an edge metric EM(x) is calculated with respect to the target pixel x. In some embodiments, the so-called Sobel edge detector may be employed, using the following matrices:

$$E\_h = \begin{bmatrix} -1 & -2 & -1 \\ 0 & 0 & 0 \\ 1 & 2 & 1 \end{bmatrix} \text{ and } E\_v = \begin{bmatrix} -1 & 0 & 1 \\ -2 & 0 & 2 \\ -1 & 0 & 1 \end{bmatrix}$$

The edge metric value may be calculated as follows as the convolution of the edge detection weighting matrices with the 3×3 neighborhood NH9(x) of the target pixel:

$$EM(x) = |NH9(x)*E\_h| + |NH9(x)*E\_v|$$

Figure 8:
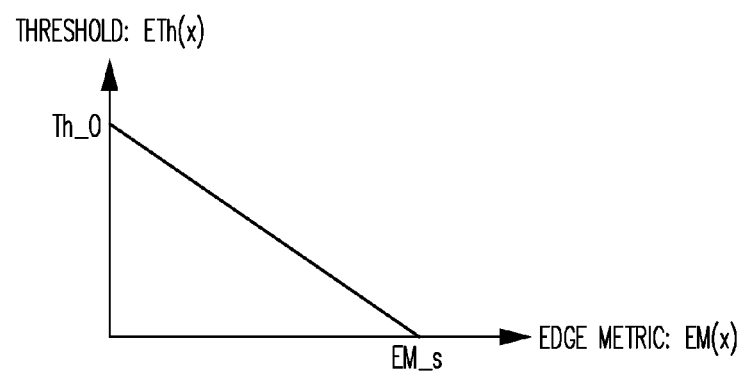
FIG. 8 graphically illustrates an aspect of the process of FIGS. 7A and 7B.

At 704 an edge-related substitution threshold ETH(x) is calculated to be used (in place of the above described threshold TH(x)) in a content adaptive substitute filtering process to be applied to the target pixel. ETH(x) may be a function of the calculated edge metric EM(x) for the target pixel; i.e.:

$$ETH(x) = f(EM(x)) = C*EM(x) + Th\_0,$$

where C and Th_0 may be pre-determined (and/or programmable) constants, and ETH(x) is constrained to be non-negative, Th_0 is greater than zero and C is less than zero. FIG. 8 graphically illustrates ETH(x). It will be appreciated that with increasing edge strength at the target pixel, the substitution threshold is reduced, so that the amount of filtering at the target pixel may be reduced. If the edge metric EM(x) reaches or exceeds a saturation point EM_s, the substitution threshold is reduced to zero and no filtering occurs at the target pixel. Thus strong edges are preserved unfiltered and blurring due to noise reduction filtering may be reduced.

Other edge detection processes besides the above-described Sobel edge detector may be employed in place of the Sobel edge detector in some embodiments. For example, the Canny edge detector may be used.

The balance of the process blocks in the process of FIGS. 7A and 7B may be the same as the blocks described above in connection with FIG. 4. In regard to the process of FIGS. 7A and 7B and other processes described herein, the illustrations and descriptions of the processes are not intended to imply a fixed order of process stages. Rather, the process stages may be performed in any order that is practicable. For example, instead of calculating the edge metric and edge-sensitive substitution threshold for each target pixel as it is selected, one or both of edge detection and threshold calculation may be performed for all target pixels in an image before substituting any neighboring pixel values and performing filtering with respect to any target pixel in the image.

Figure 9:
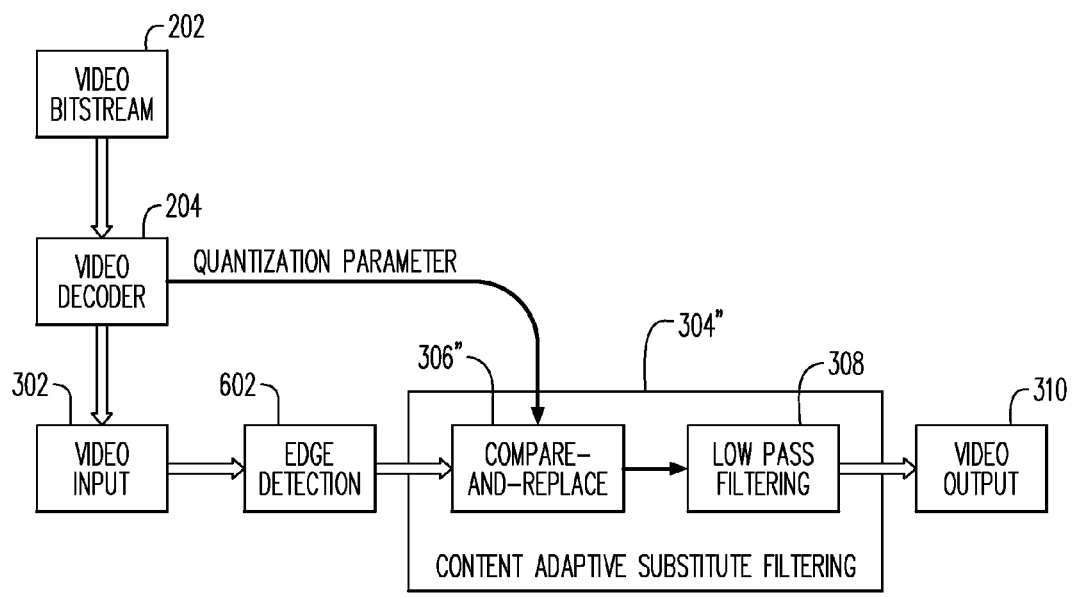
FIG. 9 is a functional block diagram that illustrates aspects of noise reduction filtering performed according to still other embodiments in the apparatus of FIG. 2.

FIG. 9 is a functional block diagram that illustrates aspects of a noise reduction process performed in the post-processing block 206 in accordance with still other embodiments. In the embodiments now to be described in connection with FIGS. 9, 10A and 10B, determination of the substitution threshold reflects both edge conditions at the target pixel and a degree of quantization previously applied during compression encoding to a now-decoded (decompressed) video signal that is to be filtered for noise reduction purposes.

FIG. 9 shows blocks 202 and 204 discussed above in connection with FIG. 2, blocks 302 and 310 discussed in connection with FIG. 3 and block 602 discussed in connection with FIG. 6. In addition, the content adaptive substitute block (now labeled 304"), and in particular its constituent compare and replace block (now labeled 306") are also present, with the compare and replace block 306" having been modified to receive from the video decoder block 204 a signal that indicates a degree of quantization employed in the compression-encoding of the video signal decoded by block 204. The compare and replace block 306" generates substitution threshold values based both on edge conditions detected by block 602 and on the signal from the video decoder 204 to indicate the degree of quantization.

Figure 10A:
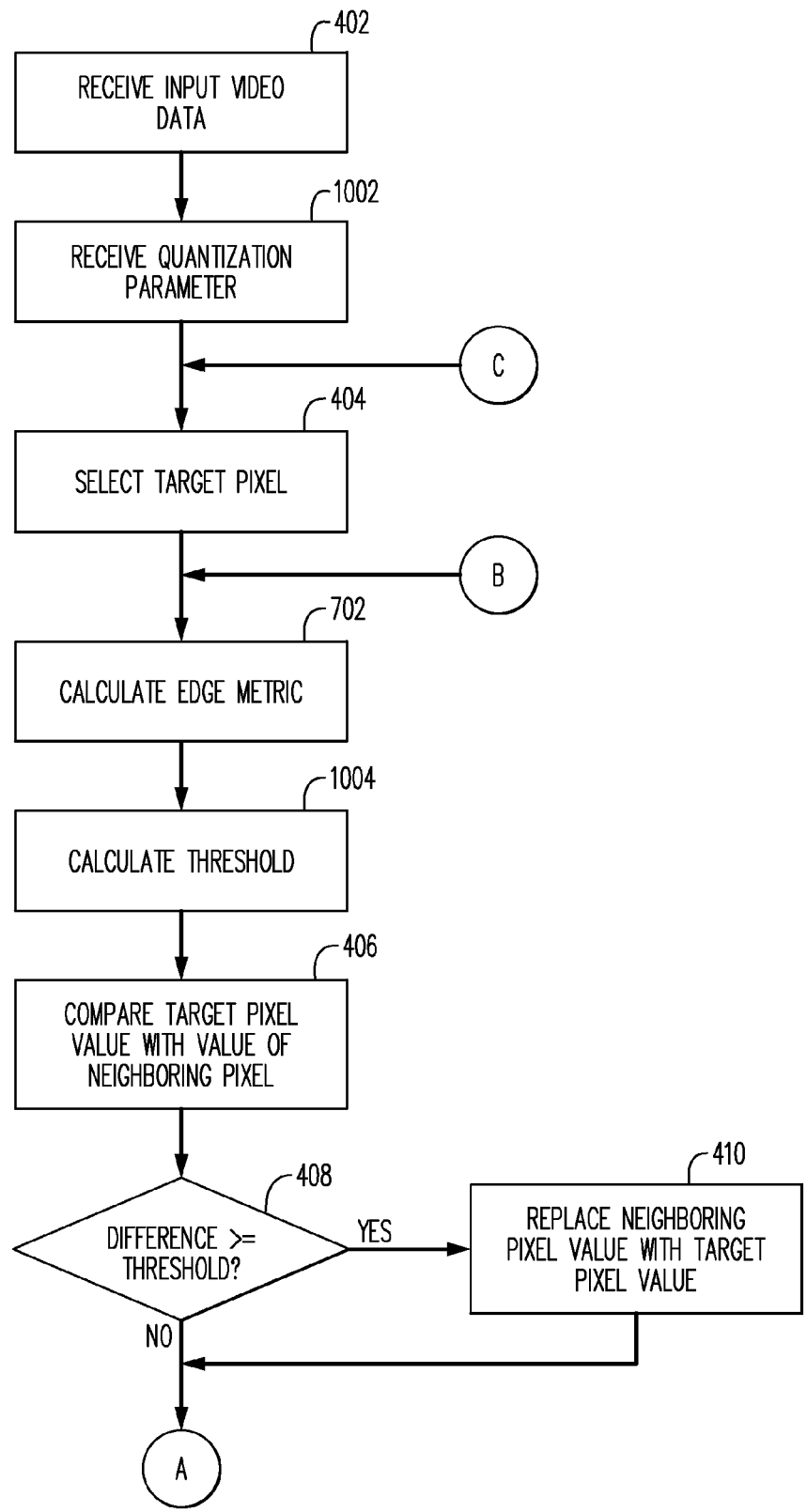
FIGS. 10A and 10B together form a flow chart that illustrates a process that may be performed in connection with the functional arrangement of FIG. 9.
Figure 10B:
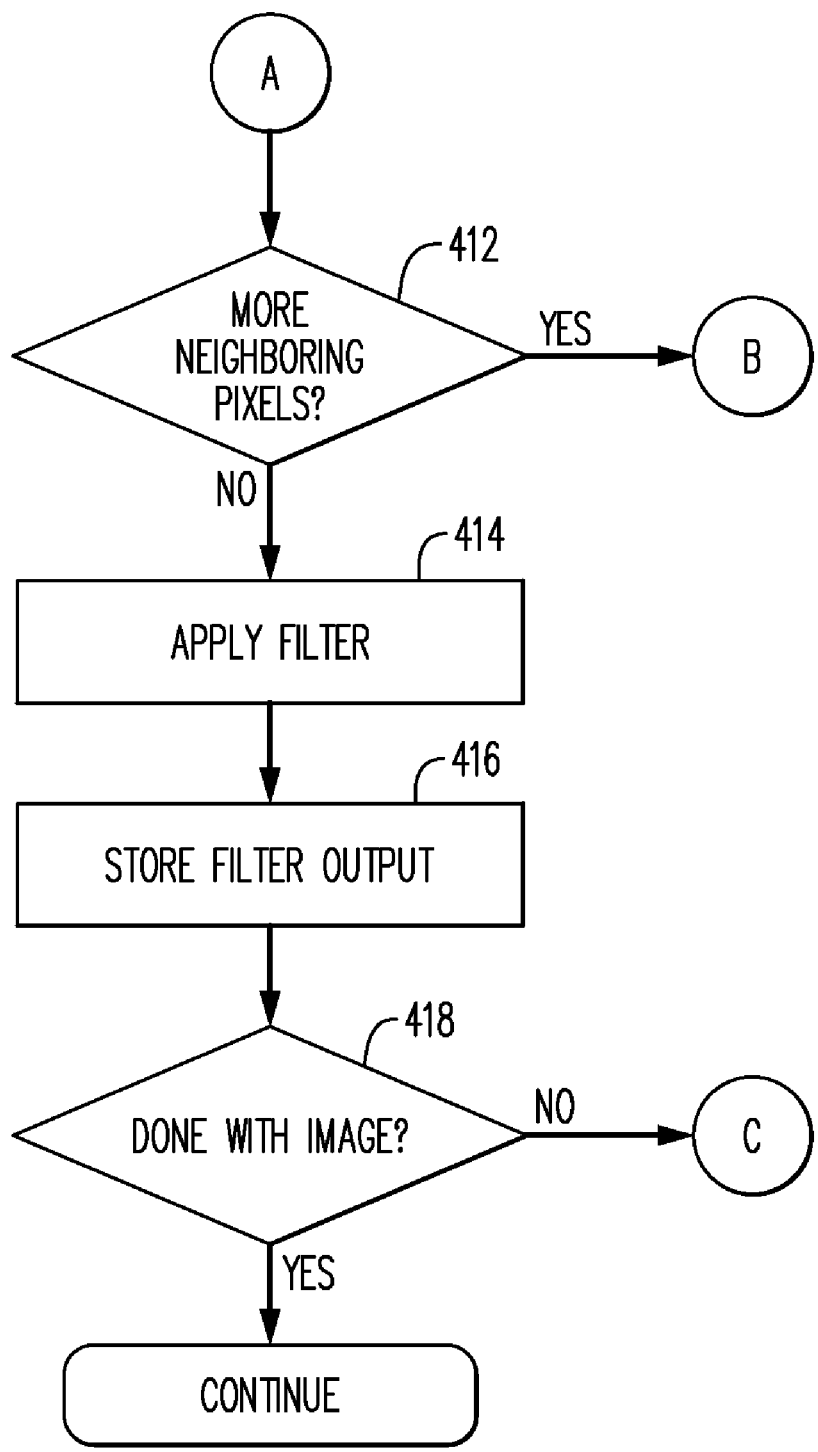

FIGS. 10A and 10B together form a flow chart that illustrates an embodiment of a decoder-assisted edge-sensitive adaptive substitute filtering process that may be performed by blocks 602 and 304" of FIG. 9. The process of FIGS. 10A and 10B may begin with the same block 402 as discussed in connection with FIG. 4. At 1002 in FIG. 10A, the compare and replace block 306" receives from the video decoder 204 a quantization parameter signal QP(x) which increases in proportion to the degree of quantization (coarseness of quantization) that was applied during compression encoding of the video signal decoded by the video decoder 204.

The process of FIGS. 10A and 10B further includes block 404 discussed above in connection with FIG. 4, and block 702 discussed above in connection with FIG. 7A. At 1004 a quantization-adaptive edge-related substitution threshold ETH(x) is calculated to be used in a content adaptive substitute filtering process to be applied to the target pixel. In some embodiments, ETH(x) may be calculated according to the following formula:

$$ETH(x) = C*EM(x) + K*QP(x),$$

where K is a pre-determined (and/or programmable) constant. Both K and QP(x) are greater than zero in this example; C and EM(x) are as described in connection with 702 and 704 of FIG. 7A. With this arrangement, the degree of filtering that may be performed by block 304" may increase with the degree of quantization applied to the video signal during compression encoding. This may be desirable, since an increased amount of coding noise may be present where more quantization was applied.

The balance of the process blocks in the process of FIGS. 10A and 10B may be the same as the blocks described above in connection with FIG. 4.

In some embodiments, edge detection may be omitted or may not be present and/or C may be set to zero, so that the substitution threshold is quantization-adaptive but not edge-related.

The edge detection block and/or the content adaptive substitute filtering block, or other blocks herein, may be implemented as application-specific logic circuitry or by one or more programmable processors controlled by software instructions stored in a memory or memories coupled to the processor or processors.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method of operating a noise reduction circuit and a compression-encoding circuit, the method comprising:
   subtracting, in the noise reduction circuit, a value of a target pixel from a respective value of each of a plurality of pixels located in an area that includes the target pixel;
   for each pixel of said plurality of pixels that has a value different by at least a threshold amount from the value of the target pixel, replacing, in the noise reduction circuit, the value of said each pixel with the value of the target pixel;
   applying, in the noise reduction circuit, a filter function to a set of pixel values, said set of pixel values including the value of the target pixel and current values, after said replacing, of said plurality of pixels, said filter function producing a filtered video signal that is output from said noise reduction circuit;
   compression-encoding, in the compression-encoding circuit, the filtered video signal output from the noise reduction circuit.

2. The method of claim 1, wherein the area is a three-pixel-by-three-pixel square.

3. The method of claim 2, wherein the filter function is defined by a weight matrix as follows:

$$\begin{bmatrix} 1 & 2 & 1 \\ 2 & 4 & 2 \\ 1 & 2 & 1 \end{bmatrix}.$$

4. The method of claim 1, further comprising:
   before said replacing, calculating an edge metric for said target pixel;
   and wherein said threshold amount is a function of said edge metric for said target pixel.

5. A method of operating a noise reduction circuit and a compression-encoding circuit, the method comprising:
   comparing, in the noise reduction circuit, a value of a target pixel with a respective value of each of a plurality of pixels located in an area that includes the target pixel;
   for each pixel of said plurality of pixels that has a value different by at least a threshold amount from the value of the target pixel, replacing, in the noise reduction circuit, the value of said each pixel with the value of the target pixel;
   applying, in the noise reduction circuit, a filter function to a set of pixel values, said set of pixel values including the value of the target pixel and current values, after said replacing, of said plurality of pixels, said filter function producing a filtered video signal that is output from said noise reduction circuit;
   compression-encoding, in the compression-encoding circuit, the filtered video signal output from the noise reduction circuit.

6. The method of claim 5, wherein the area is a three-pixel-by-three-pixel square.

7. The method of claim 6, wherein the filter function is defined by a weight matrix as follows:

$$\begin{bmatrix} 1 & 2 & 1 \\ 2 & 4 & 2 \\ 1 & 2 & 1 \end{bmatrix}$$

8. The method of claim 5, further comprising:
   before said replacing, calculating an edge metric for said target pixel;
   and wherein said threshold amount is a function of said edge metric for said target pixel.

9. A system comprising:
   a source of a video signal;
   a noise reduction circuit coupled to said source of a video signal; and
   a compression encoding circuit coupled to said noise reduction circuit;
   said noise reduction circuit operative to:
     compare a value of a target pixel with a respective value of each of a plurality of pixels located in an area that includes the target pixel;
     for each pixel of said plurality of pixels that has a value different by at least a threshold amount from the value of the target pixel, replace the value of said each pixel with the value of the target pixel; and
     apply a filter function to a set of pixel values, said set of pixel values including the value of the target pixel and current values, after said replacing, of said plurality of pixels, said filter function producing a filtered video signal that is output from said noise reduction circuit;
   wherein said compression encoding circuit receives said filtered video signal from said noise reduction circuit and compression-encodes said filtered video signal.

10. The system of claim 9, wherein said noise reduction circuit is further operative to:
    store an output value of said filter function as a filtered value of the target pixel.

11. The system of claim 9, wherein the area is a three-pixel-by-three-pixel square.

12. The system of claim 11, wherein the filter function is defined by a weight matrix as follows:

$$\begin{bmatrix} 1 & 2 & 1 \\ 2 & 4 & 2 \\ 1 & 2 & 1 \end{bmatrix}.$$

13. The system of claim 9, wherein said noise reduction circuit is further operative to:
    before said replacing, calculate an edge metric for said target pixel;
    and wherein said threshold amount is a function of said edge metric for said target pixel.

* * * * *